United States Patent [19]

Kitamura et al.

[11] Patent Number: 4,870,307
[45] Date of Patent: Sep. 26, 1989

[54] BLOCK-MOUNTED WATER COOLED AC GENERATOR

[75] Inventors: Yutaka Kitamura; Hiroaki Aso, both of Hyogo, Japan

[73] Assignee: Mitsubishi Denki Kabushiki Kaisha, Tokyo, Japan

[21] Appl. No.: 180,935

[22] Filed: Apr. 13, 1988

[30] Foreign Application Priority Data

Apr. 13, 1987 [JP] Japan .................. 62-91219

[51] Int. Cl.⁴ ................................. H02K 9/19
[52] U.S. Cl. .................... 310/54; 123/41.31; 165/51; 310/89
[58] Field of Search ............... 310/54, 68 D, 58, 59, 310/89; 123/41.31, 41.15; 165/51

[56] References Cited

U.S. PATENT DOCUMENTS

| | | | |
|---|---|---|---|
| 3,440,461 | 4/1969 | Potter | 310/54 |
| 4,262,224 | 4/1981 | Kofink et al. | 310/54 |
| 4,514,652 | 4/1985 | Olson | 310/54 |
| 4,739,204 | 4/1988 | Kitamura et al. | 310/68 D |
| 4,764,699 | 8/1988 | Nold | 310/89 |
| 4,818,906 | 4/1989 | Kitamura et al. | 310/58 |

Primary Examiner—Patrick R. Salce
Assistant Examiner—D. L. Rebsch
Attorney, Agent, or Firm—Sughrue, Mion, Zinn, Macpeak & Seas

[57] ABSTRACT

An ac generator for a vehicle comprises a rotor field core fixed on a rotary shaft and magnetized by a field coil, a stator armature core surrounding the rotor field core, a stator armature coil wound on the stator armature core, an enclosure for liquid-tightly covering the stator armature coil, a generally cylindrical front bracket and a rear bracket. The front and the rear brackets are mounted directly to the cylinder block of the engine for defining a coolant passage between the front bracket, an outer wall of the rear bracket and an outer surface of the enclosure, the coolant passage having an inlet port connected to a upstream portion of an engine coolant passage and an outlet port connected to a downstream portion of the engine coolant passage, so that a portion of engine coolant flows through the coolant passage to cool at least the stator armature coil and the stator armature core.

4 Claims, 3 Drawing Sheets

BLOCK-MOUNTED WATER COOLED AC GENERATOR

BACKGROUND OF THE INVENTION

The present invention relates to a vehicle mounted ac generator and, particularly, to a cooling structure of such generator.

FIG. 6 shows an example of a conventional vehicle mounted ac generator in cross section. In FIG. 6, a pulley 2 is fixed on a rotary shaft 1 on which a rotor 3 is also fixed. The rotor 3 includes a rotating magnetic field core 4, a field core 5 having a plurality of pole portions 5a extending equiangularly therefrom in parallel to a rotary axis thereof, a support ring 6 of non-magnetic material affixed to an inner periphery of the pole portions 5a and another field core 7 having a plurality of pole portions 7a extending equiangularly therefrom in parallel to the rotary axis. The pole portions 5a and the pole portions 7a are arranged alternately to each other.

The ac generator further includes a stationary field core 8 arranged with air gaps to the rotating field core 4 and the field core 7, a field coil 9 supported by the core 8, an armature core 10 having slots in which an armature coil 11 is supported, a front bracket 12 for supporting through a front bearing 14 the rotary shaft 1 and the armature core 10, a rear bracket 13 for supporting through a rear bearing 15 the rotary shaft 1, the armature core 10 and the field core 8, a rectifier 16 for converting an ac power induced in the armature coil 11 into a dc power, a voltage regulator 17 responsive to an output voltage of the generator for controlling a field current to regulate a terminal voltage to a predetermined value and a fan 18 fixed on the rotary shaft 1. The front bracket 12 has outlet ports 12a for coolant air and the rear bracket 13 has inlet ports 13a for coolant air.

The rotary shaft 1 is rotated by a vehicle engine through a belt to induce an ac voltage in the armature coil 11, which is regulated by the voltage regulator 17 suitably. A dc power obtained by rectifying the regulated ac voltage is supplied to the field coil 9 and to a load such as a battery.

Cooling air is introduced through the inlet ports 13a of the rear bracket 13 to an interior of the generator by the fan 18 and discharged from the outlet ports 12a of the front bracket 12.

In the conventional generator constructed as above, a cooling capacity of the fan 18 is usually insufficient to cool the armature coil 11, the rectifier 16, the voltage regulator 17 and the field coil 9, satisfactorily. Therefore, it is difficult to increase an output current due to a limitation of thermal durability of these components. Further, due to an insufficient cooling of the field coil 9, the output current tends to decrease.

It may be considered, in order to eliminate these problems, to make the fan 18 larger. In such case, noise problems and mounting problems occur. Since there is a limitation of cooling when the fan 18 is used therefor, it is difficult to increase an output current and it is necessary to design the device by taking a considerable lowering of an output into consideration.

SUMMARY OF THE INVENTION

The present invention was made in view of such problems and an object thereof is to provide an ac generator for a vehicle in which a cooling efficiency is improved by connecting a bracket of the generator directly to a cylinder block of an engine so that the generator is cooled by a portion of the coolant of the engine to thereby make it compact and increase its output. Further, the lowering of the output current is restricted by cooling an armature coil efficiently.

The ac generator for vehicle use includes brackets mounted on a cylinder block of an engine, enclosures for covering opposite end portions of a stationary armature coil liquid-tightly, respectively, and a passage provided between an inner wall of the brackets and the enclosures for allowing engine coolant to pass therethrough.

In the present invention, the stationary armature coil and a stationary armature core are cooled effectively by coolant liquid passing through the passage.

DETAILED DESCRIPTION OF THE PREFERRED EMBODIMENTS

Figure 1:
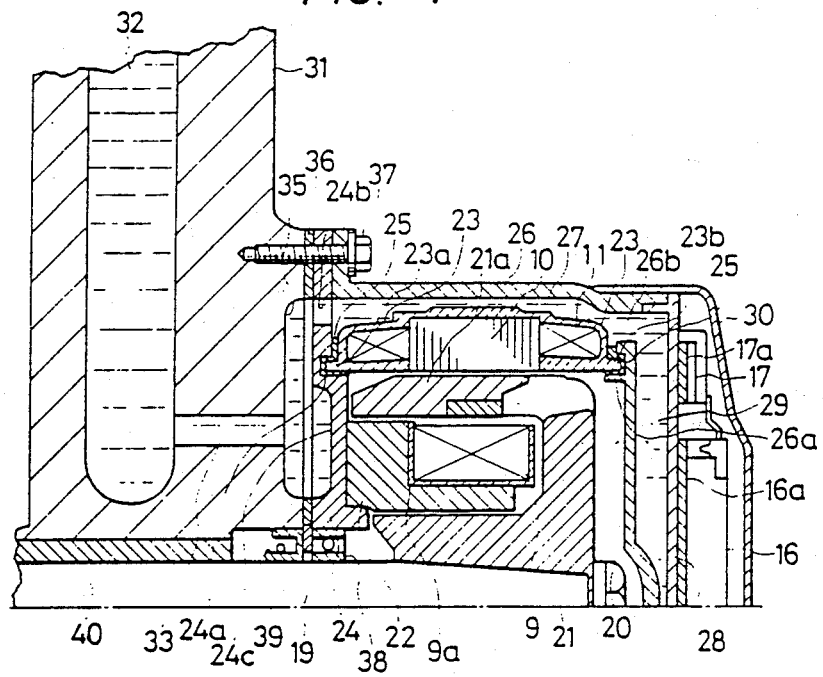
FIG. 1 is a cross section of an embodiment of the present invention.
Figure 2:
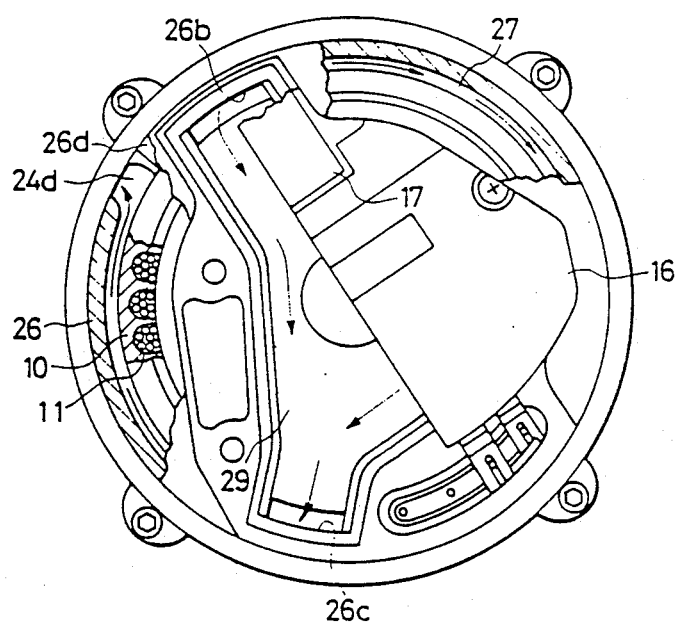
FIG. 2 is a partially cross sectional front view of the device in FIG. 1 with a protection cover being removed.

In FIGS. 1 and 2 which are a cross section of an embodiment of the present invention and a front view thereof, respectively, a rotary shaft 19 is driven by a crank of an engine at a speed twice the engine rotation usually. A rotor 20 is fixed on the rotary shaft 19 and comprises a field core 21 having a plurality of pole portions 21a providing different magnetic poles arranged alternately. A field core 22 is arranged so as to oppose the field core 21 with an air gap therebetween, on which a field coil 9 is mounted. A pair of enclosures 23 are affixed to an armature core 10 to enclose opposite end portions of an armature coil 11, liquid-tightly, respectively. The enclosures 23 are of electrically insulating material such as synthetic resin.

A rear bracket 24 has an annular groove 24a to which an edge 23a of a cylindrical enclosure 23 is fitted liquid-tightly through a gasket 25 of viscose silicon to support the armature core 10 and is provided with a bearing 38 through which the rotary shaft 19 is supported. The rear bracket 24 is further provided with an inlet port 24 for coolant, a recess 24c for forming a coolant passage and an outlet port 24d for coolant. A front bracket 26 is liquid-tightly connected to the rear bracket 24 through an O-ring ( not shown ) etc. The front bracket 26 has an annular groove 26a in which the other edge 23b of the cylindrical enclosure 23 is received liquid-tightly through a viscose gasket 25. The front bracket 26 supports the armature core 10 and is provided with a branch hole 26b for coolant and a return hole 26c. The front bracket 26 forms a peripheral coolant passage 27 between an inner wall thereof and a rear surface of the enclosure 23 and a partition 26d between an inlet side and a discharge side.

A coolant cover 28 of thermally conductive metal material is liquid-tightly attached to an outer end portion of the front bracket 26 to form a branch passage 29 for coolant so that coolant from the branch hole 26b can flow from the return hole 26c to an intermediate portion of the passage 27.

The rectifier 16 and the voltage regulator 17 are mounted through heat sinks 16a and 17a to the outer surface of the coolant cover 28, respectively. A protection cover 30 is also mounted on the front bracket 26.

A coolant circulating passage 32 is formed in the cylinder block of an engine. A guide passage 33 is also formed in the cylinder block 31 to guide a portion of engine coolant from the coolant circulating passage 32 to the generator. A discharge passage ( not shown ) is also formed in the cylinder block 31, which communicates with a downstream portion of the circulating passage 32 and discharges the coolant passed through the generator. A recess 35 is formed in the cylinder block 31, which, together with the recess 24c of the rear bracket 24, forms a coolant passage. A sealing gasket 36 is provided between the cylinder block 31 and the rear bracket 24. The brackets 24 and 26 and the gasket 36 are secured to the cylinder block 31 by bolts 37. Reference numerals 39 and 40 depict a seal and a bearing, respectively, provided between the rotary shaft 19 and the cylinder block 31.

In the embodiment mentioned above, a portion of the engine coolant at low temperature is branched from the circulating passage 32 and flows through the inlet passage 33 and the inlet port 24b to the passage 27 in a direction shown by an arrow to cool the field core 22, the field coil 9, the stationary armature core 10 and the stationary armature coil 11. The coolant portion, whose temperature is raised by passing through these components, is returned through the outlet port 24d and the discharge passage to a downstream return pass portion of the coolant circulating passage 32 of the engine.

A portion of the coolant which has passed through the inlet port 24b to the passage 27 flows through the branch port 26b and the passage 29 in a direction shown by an arrow to cool through the cooling cover 28 the rectifier 16 and the voltage regulator 17 and is returned through the return port 26c to an intermediate portion of the passage 27.

The rear bracket 24 which is cooled directly by coolant cools the ball bearing 38 directly and the field coil 9 through the field core 22.

Thus, the stationary armature coil 11, the rectifier 16, the voltage regulator 17 and the field coil 9 which are considerable heat sources are cooled, so that a temperature rise is restricted effectively.

Figure 3:
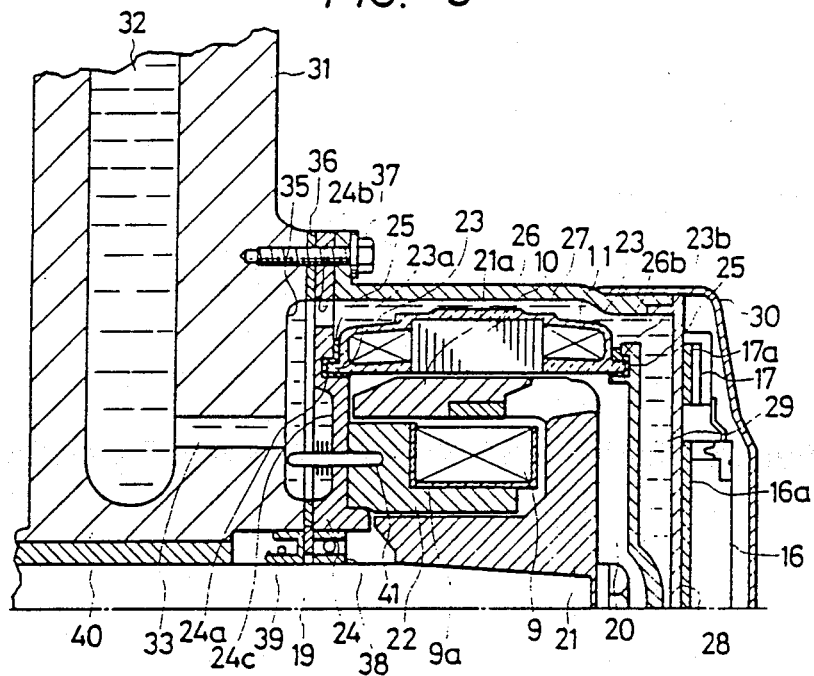
FIG. 3 is a cross section showing another embodiment of the present invention.

In another embodiment shown in FIG. 3, a heat pipe 41 is secured to the field core 22 and the rear bracket 24, with one end thereof being in the coolant passage, so that the cooling of the field core 22 and the field coil 9 can be performed more effectively to thereby make it possible to not reduce the field current and to increase the output current.

Figure 4:
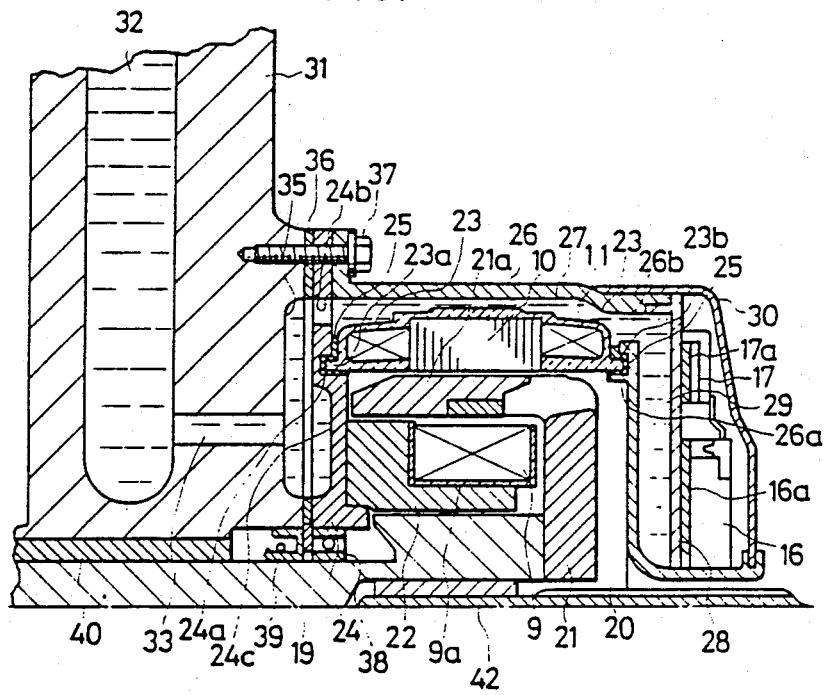
FIG. 4 is a cross section showing a further embodiment of the present invention.
Figure 6:
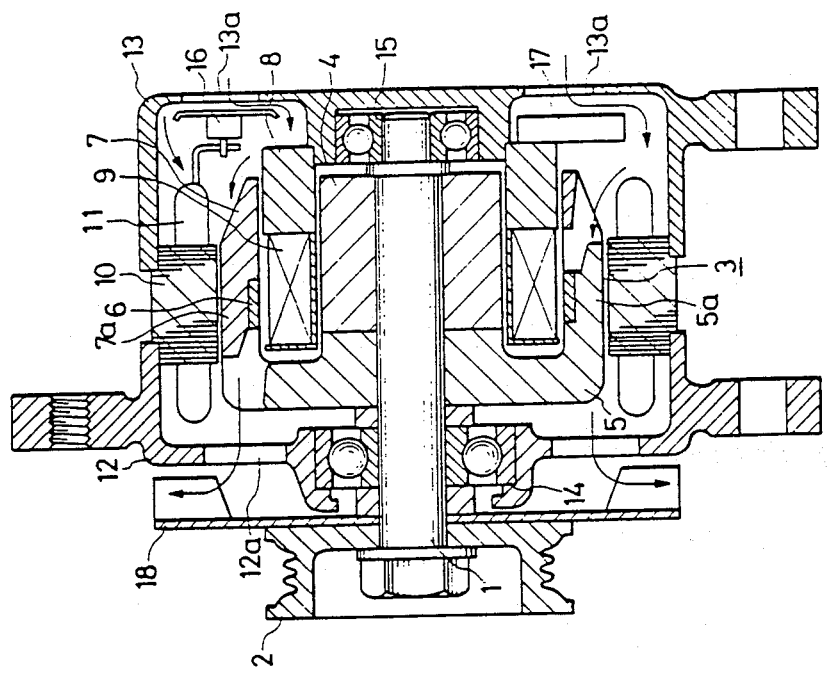
FIG. 6 is a cross section showing a conventional vehicle mounted ac generator.

In a further embodiment shown in FIG. 4, a field core 21 is integral with a rotary shaft 19 in which a rotary shaft 42, such as a drive shaft of a starter or a shaft of a change gear, is provided through a clutch ( not shown ).

Figure 5:
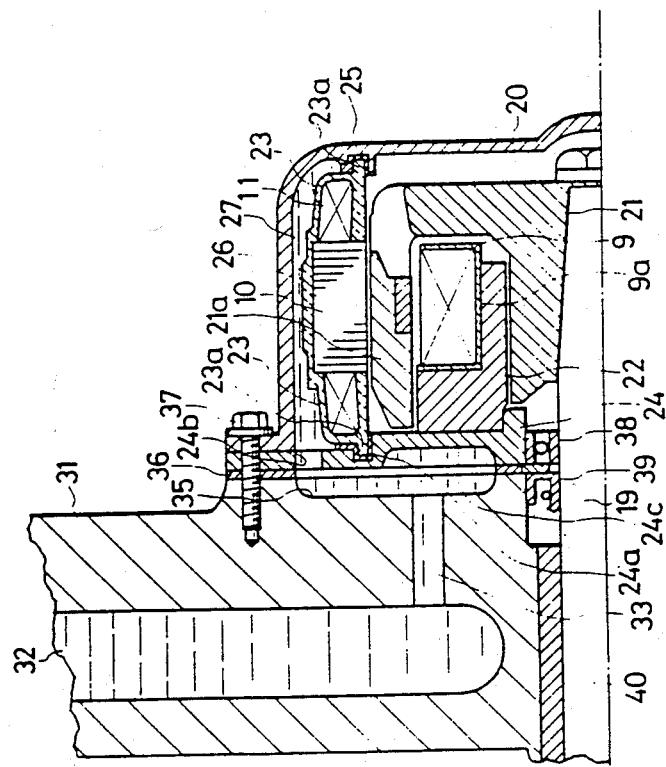
FIG. 5 is a cross section of another embodiment of the present invention.

FIG. 5 shows another embodiment of the present invention, a rectifier and a voltage regulator cooled separately from the electromagnetic components of the generator. That is, the electromagnetic components are cooled by engine coolant while the rectifier and the voltage regulator are cooled by a rotary fan or by coolant of another system such as window washer liquid.

Although the present invention has been described with reference to the embodiments in each of which the rotary shaft 19 to be driven by a crank shaft of the engine penetrates the cylinder block 31 and the rotor 20 of the generator is fixed to the rotary shaft, it is possible to arrange the rotary shaft such that it extends oppositely and is driven by the crank shaft through a pulley mounted thereon and a belt.

As described hereinbefore, according to the present invention, an ac generator for vehicles includes brackets mounted on a cylinder block of an engine directly, an enclosure for covering a stator armature coil liquid-tightly and a passage provided between an inner wall of the brackets and the enclosure for allowing engine coolant to pass therethrough.

In the present invention, the stator armature coil and a stator armature core are cooled effectively by coolant liquid passing through the passage, so that it is possible to make the generator compact and high power.

What is claimed is:

1. An ac generator for a vehicle comprising a rotor field core fixed on a rotary shaft of said generator and magnetized by a field coil, a stator armature core surrounding said rotor field core, a stator armature coil wound on said stator armature core, an enclosure for liquid-tightly covering said stator armature coil, a generally cylindrical front bracket and a rear bracket, said front and said rear brackets being mounted directly to a cylinder block of said engine for defining a coolant passage between an outer wall of said rear bracket and said cylinder block, and further between an inner surface of said front bracket and an outer surface of said enclosure, said coolant passage having an inlet port connected to an upstream portion of an engine coolant passage and an outlet port connected to a downstream portion of said engine coolant passage so that a portion of an engine coolant flows through said coolant passage to cool at least said stator armature coil and said stator armature core.

2. The ac generator as claimed in claim 1, wherein said enclosure is liquid-tightly supported by an inner wall of said rear bracket at one end and by an inner wall of said front bracket at the other end and wherein said coolant passage extends along a front end surface of said front bracket.

3. The ac generator as claimed in claim 1 or 2, wherein said rotary shaft extends through a cylinder block of said engine and is adapted to be driven by a crank shaft of said engine directly.

4. The ac generator of claim 1, wherein a portion of said coolant passage is formed by a first recess in said cylinder block together with a second recess in said outer wall of said rear bracket.

* * * * *